March 10, 1942.   F. D. CHAPMAN   2,276,157
FILLING MECHANISM
Filed Dec. 4, 1939   2 Sheets-Sheet 1
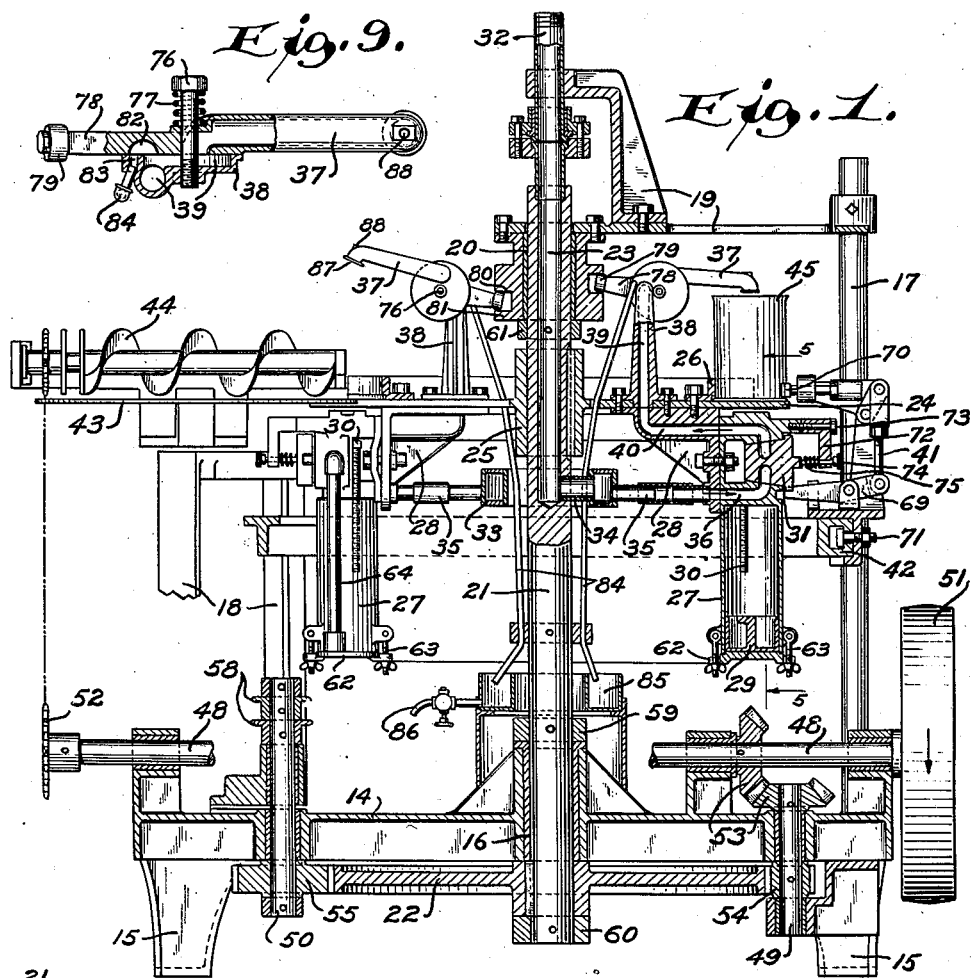
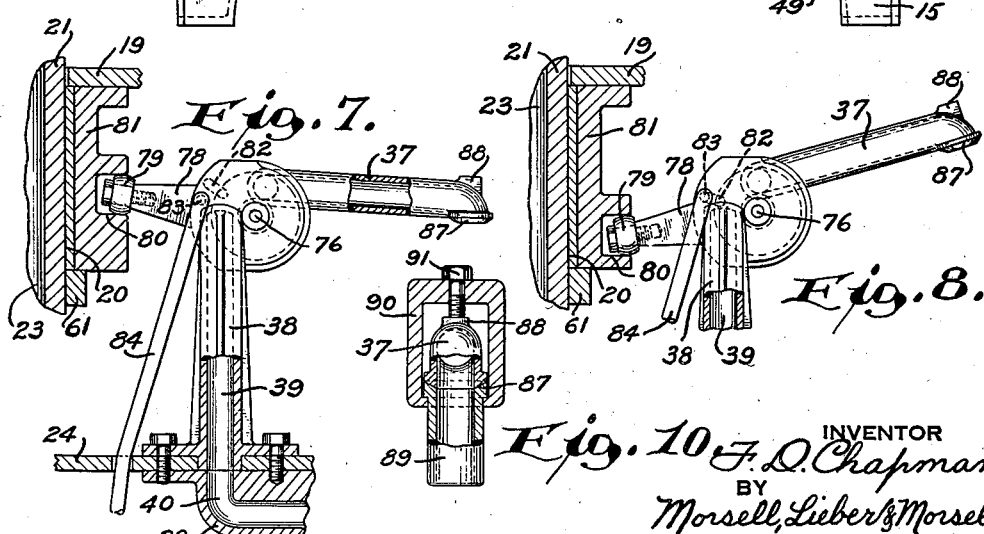
INVENTOR
F. D. Chapman
BY
Morsell, Lieber & Morsell
ATTORNEYS.

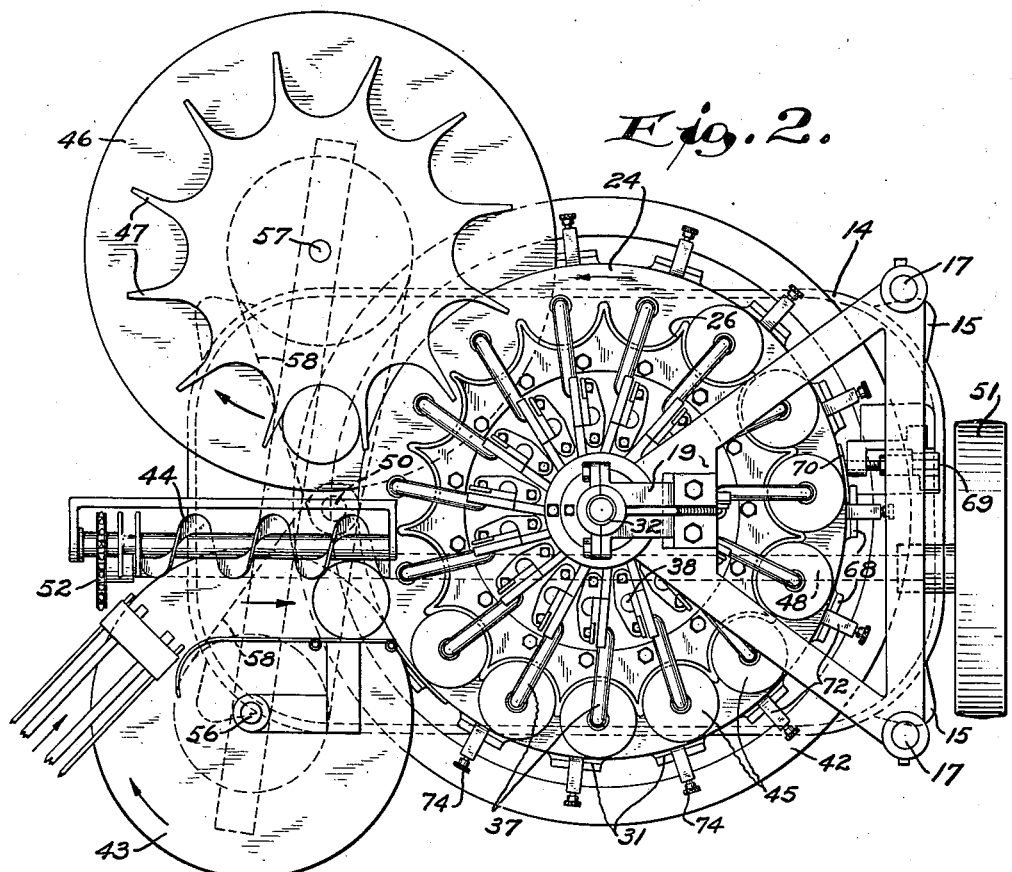
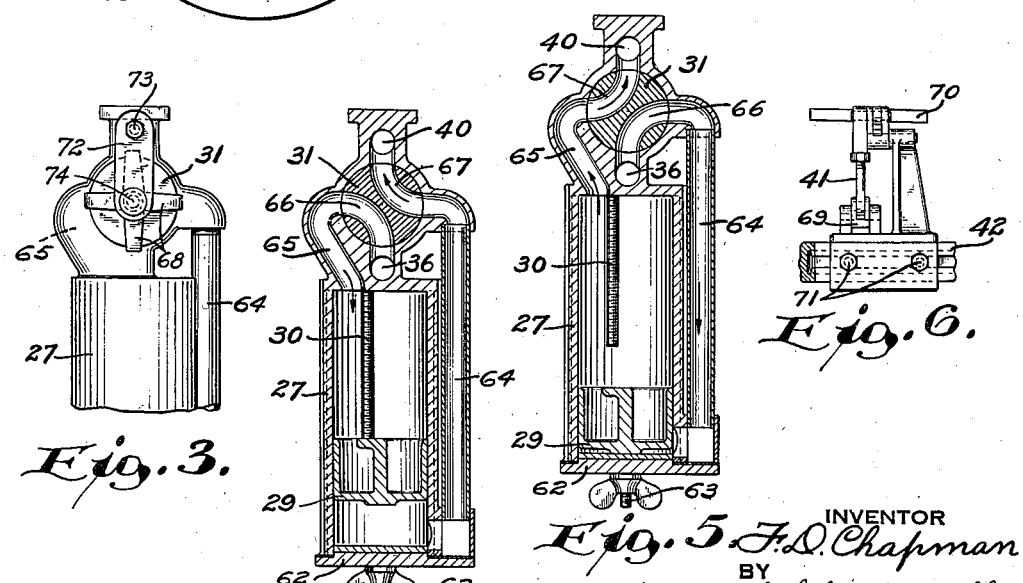

Patented Mar. 10, 1942

2,276,157

UNITED STATES PATENT OFFICE 2,276,157

FILLING MECHANISM

Frank D. Chapman, Berlin, Wis.

Application December 4, 1939, Serial No. 307,367

10 Claims. (Cl. 226—97)

This invention relates generally to improvements in the art of measuring and of dispensing liquids of various kinds, and relates more specifically to improvements in the construction and operation of filling mechanism for delivering pre-measured batches of liquid such as fruit and vegetable juices, or oils, to successive receptacles.

An object of my present invention is to provide a new and useful mechanism for accurately pre-measuring successive batches of liquid and for delivering the measured quantities to successive receptacles of an irregular series advancing along a definite path.

When filling receptacles such as tin cans with liquids such as fruit and vegetable juices, or with oils of various kinds, it is highly desirable to be able to deliver accurately pre-measured batches devoid of air to the successive receptacles at relatively high speeds, and to avoid delivery of material when the series is irregular and no receptacles are in position to receive the charges. In my co-pending application, Serial No. 291,159, filed August 21, 1939, I have shown a machine which utilizes an annular series of liquid measuring cylinders revolvable about an axis above the successive advancing receptacles, each cylinder having therein a floating piston displaceable by liquid supplied from above through a supply pipe communicating with the bottom of the cylinder to deliver successive pre-measured batches of liquid from opposite sides of the piston, to the receptacles, past a valve located beneath each cylinder. While this assemblage functions in a highly satisfactory manner when operating with certain kinds of liquid, and when the liquid supply pipes are of sufficiently small diameter, it has been found that under certain conditions of operation, air tends to enter the displacement chambers of the measuring cylinders, and thus interferes with accurate pre-measurement of the batches. Such entry of air to the measuring cylinders may not be objectionable for certain classes of work and when handling some kinds of material, but it is rather objectionable when filling receptacles with liquids such as juices and oils.

It is therefore a more specific object of my present invention to provide an automatic filler which positively precludes possible entry of air to the liquid measuring chambers, regardless of the kind of liquid being handled.

Another specific object of this invention is to provide improved instrumentalities for delivering measured batches of diverse liquids to receptacles, and for eliminating objectionable dripping of liquid from the liquid discharge nozzles or spouts.

A further specific object of the invention is to provide an improved liquid filler for delivering measured charges of fluent material to receptacles of different heights and of various volumetric capacities, without permitting excessive travel of the liquid through the ambient atmosphere.

Still another specific object of this invention is to provide an improved can filling machine wherein the same measuring mechanism may be used to most effectively fill both relatively small and extremely large containers.

An additional specific object of my invention is to provide an improved filler assemblage all parts of which are readily accessible and removable for inspection and cleaning, and which may therefore be conveniently maintained in sanitary condition.

Another specific object of the present invention is to provide an improved filling mechanism which is simple and durable in construction, which is highly efficient in use, and which can be manufactured and operated at moderate cost.

A further specific object of my invention is to provide improved flow control valve mechanism for liquid fillers or the like, which is operable most effectively at high speed, and which may be quickly assembled and dismantled.

These and other specific objects of my present invention will be apparent from the following detailed description.

A clear conception of the various features constituting my present improvement, and of the manner of constructing and of manipulating liquid filler mechanisms built in accordance with the invention, may be had by referring to the drawings accompanying and forming a part of this specification wherein like reference characters designate the same similar parts in the several views.

Fig. 1 is a transverse vertical section through one of my improved liquid filling mechanisms, showing a section through one of the measuring cylinders and an outside view of another;

Fig. 2 is a top view of the filler shown in section in Fig. 1;

Fig. 3 is an enlarged fragmentary outside view of one of the measuring cylinders and its control valve;

Fig. 4 is a similarly enlarged central vertical section through one of the measuring cylinders and its control valve, showing the floating piston thereof in elevated position and the valve positioned preparatory to moving the piston downwardly;

Fig. 5 is a likewise enlarged central vertical section through the cylinder and valve, showing the piston in lowermost position and the valve positioned preparatory to moving the piston up, and the section being taken on the line 5—5 of Fig. 1.

Fig. 6 is an outside view of one of my improved no-can-no-fill mechanisms for actuating the control valves of the measuring cylinders;

Fig. 7 is an enlarged part-sectional side view fragment of one of the liquid delivery mechanisms, showing the spout in active position;

Fig. 8 is a similarly enlarged and part-sectional side view fragment of the liquid delivery mechanism, showing the spot in inactive position;

Fig. 9 is a likewise enlarged part-sectional top view fragment of the liquid delivery mechanism, showing the spout in inactive draining position; and Fig. 10 is a further enlarged part sectional outside view of the discharge end of one of the liquid delivery spouts, showing an improved attachment for the spout end.

Although the invention has been specifically shown herein as being embodied in an automatic rotary can filler especially adapted to deliver pre-measured batches of liquid to receptacles such as tin cans, it is not the intent to thereby unnecessarily restrict the scope or utility of the improved features.

Referring to the drawings, and especially to Figs. 1 and 2, the improved liquid filler shown therein comprises in general a frame assemblage having a base 14 provided with supporting legs 15 and with a central bearing 16, upwardly extending posts 17 and columns 18 secured to the base 14, and an upper bracket 19 detachably secured to the posts 17 and having a bearing 20 disposed concentric with the base bearing 16; a central upright shaft 21 journalled for rotation in the bearings 16, 20 and having a driving gear 22 at its lower end while the upper shaft portion is provided with a central passage or duct 23; a circular can supporting plate or disk 24 having an integral hub 25 firmly secured to the shaft 21 near the upper bearing 20, and being provided at its top with an annular series of can transporting hooks 26; an annular series of elongated vertically disposed liquid measuring pockets or cylinders 27 suspended beneath the supporting disk 24 by means of brackets 28, and each having therein a floating displacement plunger or piston 29 and an adjustable screw threaded rod 30 for varying the limits of travel of the piston 29; a tapered rotary control valve 31 interposed between each cylinder 27 and the supporting disk 24; a central liquid supply pipe 32 supported by the top bracket 19 and communicating with a suitable liquid source, and with the upper end of the central shaft duct 23; an annular liquid header 33 carried by the shaft 21 beneath the hub 25 and communicating with the shaft duct 23 through a nipple 34, and with the several valves 31 through flexible conduits 35 and ducts 36; a series of liquid delivery spouts 37 pivotally suspended from hollow standards 38 carried by the supporting disk 24, and communicating with the corresponding valves 31 through ducts 39 in the standards 38 and through other ducts 40 in the brackets 28; one or more no-can-no-fill mechanisms 41 adjustably associated with a carrier ring 42 suspended from the posts 17 and columns 18, and being cooperable with the control valves 31; mechanism including a rotary disk 43 and a feed screw 44 for feeding empty cans 45 to the machine; mechanism including a rotary disk 46 and can hooks 47 for delivering the filled cans 45 from the machine; and driving mechanism consisting of a horizontal main shaft 48 and gearing for driving the movable parts of the filler in unison.

The frame assemblage may be varied in structure to suit different conditions, and the base 14 besides providing a support for the shafts 21, 48 and for the superstructure of the machine, has bearings for rotatably supporting several counter shafts 49, 50. The driving shaft 48 which spans the base 14 has a driving pulley 51 at one end, and chain gearing 52 at its opposite end for driving the can feed screw 44; and the medial portion of the shaft 48 is drivingly connected to the counter shaft 49 by bevel gears 53, while this counter shaft is drivingly connected with the main gear 22 by a pinion 54. The other counter shaft 50 is adapted to be driven from the main gear 22 by means of a pinion 55, and the shaft 50 is drivingly connected to the driving shafts 56, 57 of the disks 43, 46 respectively, by means of chain gearing 58. The vertical central shaft 21 which is journalled in the bearings 16, 20, is provided with lower collars 59, 60 for preventing axial displacement of the shaft, and also has an upper collar 61 thereon adjacent the upper bearing 20 for bracing the bracket 19. The posts 17 and columns 18 are firmly attached to the base 14, and the upper bracket 19 which is normally clamped to the posts 17, may be vertically removed from these posts 17, and from the upper end of the central shaft 21 and collar 61 upon release of the clamping screws.

The can supporting plate or disk 24 which is keyed to the central shaft 21 and is therefore rotatable therewith, cooperates with the can feed and discharge disks 43, 46 respectively and with the feed screw 44, to normally transport a continuous series of cans 45 to, through and from the filler, and suitable can chutes and guides should be provided to properly conduct the receptacles. The brackets 28 which may be formed separate or integral, are rigidly connected to the disk 24, and the measuring cylinders 27 are likewise rigidly attached to and are suspended from the brackets 28, so that the brackets 28 and the cylinders 27 revolve with the disk 24 and shaft 21. Each measuring pocket or cylinder 27 has a central bore within which the corresponding plunger or piston 29 is freely slidable, and the lower ends of the cylinders 27 are normally sealed by removable end heads 62 held in place by bolts 63. Each cylinder 27 also has a port 64 connecting the lower end thereof with the tapered bore of the corresponding control valve 31, and furthermore has a port 65 which connects the upper cylinder end with the same valve bore, see Figs. 4 and 5. The adjustable screw threaded rods 30 which limit the strokes of the pistons 29, are manipulable to vary these strokes, from the exteriors of the cylinders 27, and the capacities of these cylinders are such that one or more movements of the piston 29 of each measuring unit may be utilized to fill each can 45 to the desired extent.

The rotary control valves 31 which are operable by the no-can-no-fill device or mechanism during normal revolution of the cylinders 27 about the central axis of the shaft 21, only when cans 41 are in position to receive charges of liquid; are of like and interchangeable construction, and are snugly confined for rotation about their own axes within tapered bores in the upper ends of the cylinder casings. Each of the valves 31 has two similar ports 66, 67 therein as shown in Figs. 4 and 5, and is provided with outwardly extending radial ribs 68 which are adapted to be engaged by a lower lever 69 of the several mechanisms 41, whenever a can 45 is present as the corresponding cylinder 27 approaches a no-can-no-fill device. If only one of the no-can-no-fill mechanisms 41 is provided, then only one measured charge will be delivered during each complete revolution of each cylinder 27 and its valve 31 about the central axis; but two or more of the mechanisms 41 may be attached to the ring 42 at spaced intervals, in order to cause delivery of corresponding numbers of measured batches to each can 45. The valves 31 are rotatable about their own axes by steps of ninety degrees, and when a control valve 31 is in the position shown in Fig. 4, the displacement chamber below the piston 29 is connected through the duct 64, port 67 and ducts 40, 39 with the corresponding discharge spout 37; while the upper displacement chamber above the same piston 29 is connected with the source of liquid supply through the duct 65, port 66, duct 36, header 33, duct 23 and pipe 32. With a valve 31 and a piston 29 so positioned, the head of liquid will create downward pressure on top of the piston 29 and will cause the piston to discharge the measured batch therebeneath, while the upper displacement chamber is supplied with a like quantity of fresh liquid. When the same valve 31 is subsequently shifted to the position shown in Fig. 5, the displacement chamber above the piston 29 is connected through the duct 65, port 67 and ducts 40, 39 with the corresponding discharge spout 37; while the lower displacement chamber below the same piston 29 is connected with the source of liquid supply through the duct 64, port 66, duct 36, header 33, duct 23 and pipe 32. The supply liquid will then enter the lower piston displacement chamber and will force the piston 29 upwardly against the stop rod 30 as in Fig. 4, to thereby likewise expel a measured batch of liquid equal in volume to that delivered during the preceding downward piston stroke. Subsequent quarter rotations of the valve 31 will cause alternate delivery of accurately measured batches from the chambers on opposite sides of the floating piston 29, and the volumes of the measured batches may be varied at will, by manipulation of the rods 30.

Each valve 31 will be thus rotated or operated, whenever the corresponding measuring cylinder 27 passes a tripping device 41 and a can 45 is in position to receive a measured charge, and when no can 45 is thus positioned, the valve will not be actuated and no charge or batch of liquid will be delivered. The construction and operation of the no-can-no-fill mechanism 41 shown in Figs. 1, 2 and 6, may be varied considerably, but this device has a shoe 70 adapted to be engaged by the successive cans 45 of the series, and when the shoe 70 is engaged and moved outwardly, it swings the inner end of the lever 69 upwardly into engagement with the adjacent advancing actuating rib 68 of the corresponding valve 31 as illustrated in Fig. 1, thereby causing automatic discharge of a measured batch of liquid to the can 45 which has just engaged the shoe 70. Obviously when the shoe 70 is not engaged by a can 45, no delivery of liquid occurs; and the device or mechanism 41 may be fixedly positioned at any desired place along the ring 42 with the aid of clamping bolts 71, and any desired number of the mechanisms 41 may be utilized so as to deliver more than one measured batch of liquid to each can 45. In this manner the successive cans 45 may be either partially or completely filled with accurately pre-measured charges of any desired volume, and large or small cans 45 may be filled by the same machine.

The rotary control valves 31 are normally held in place by means of retaining arms 72 each of which is secured to the adjacent cylinder casing by means of a cap screw 73, and has an end reaching centrally over the end of the adjacent valve 31. The overhanging end of each arm 72 is provided with a spring pressed pin 74 which is urged inwardly against the ribs 68 of the adjacent valve 31 by a spring 75, and these pins 74 therefore resiliently urge the valves 31 within their bores while permitting relatively free rotation of the valves by the levers 69. With this construction, the several valves 31 may be readily removed for inspection and cleaning, by merely loosening the cap screws 73, retracting the spring pressed pins 74, swinging the arms 72 out of alinement with the valve bores, and subsequently withdrawing the valves 31 axially. Because of the symmetrical and like construction of the valves 31, it makes no difference how the valves are reinserted within their bores, or in which bore they are placed, as these valves will always be ready for proper operation by the levers 69.

The liquid delivery nozzles or spouts 37 which are pivotally suspended from the hollow standards 38 mounted on the supporting disk 24, are of improved construction in order to eliminate dripping of liquid from the discharge orifices after each batch has been delivered. Each of the spouts 37 is swingably suspended from its standard 38 by means of a pivot bolt 76, and is urged into sealing engagement in contact with a plane side surface of the standard top by means of a compression spring 77 as shown in Fig. 9, so that the duct 39 is always in open communication with the spout interior. Each spout 37 has a rearwardly or inwardly extending arm 78 provided with a roller 79 coacting with a cam groove 80 formed in a fixed element 81 in which the upper bearing 20 is formed and which coacts with the rotating collar 61 on the shaft 21, so that as the spouts 37 are revolved about the central axis of the shaft 21, the discharge ends thereof will move toward and away from the supporting disk 24 as clearly shown in Figs. 7 and 8. The enlarged medial portion of each spout 37 is provided with a liquid drip drainage recess 82 which is communicable with a port 83 formed in the adjacent enlarged top portion of the standard 38 when the spout 37 is swung upwardly as in Fig. 8, but which does not communicate with the port 83 when the spout is down or in normal discharge position as in Fig. 7. All of the ports 83 are connected by drip drain pipes 84 with a common annular stationary drip catch pan 85 shown in Fig. 1, and this pan 85 may be provided with a valve controlled liquid drain 86 for periodically removing the accumulated drippings. With this improved assemblage, the revolving spouts 37 will stop dripping as soon as they are elevated as in Fig. 8, following each delivery of a measured batch of liquid therethrough, and the drippings which would otherwise drop from the spouts 37 are drained into the pan 85 and are not wasted.

The delivery ends of the spouts 37 should be located as close as possible to the upper open ends of the cans 45 when charges of liquid are being discharged into these cans, as shown in Fig. 1, in order to avoid prolonged exposure of liquid to the ambient atmosphere, and to prevent waste of liquid by splashing. In order to permit use of the spouts 37 with cans of different heights, I provide the discharge end of each spout 37 with a rounded lower annular surface 87 and with an upper recessed projection or boss 88, as clearly shown in Fig. 10. A nozzle extension 89 of any suitable length and having a spherical zone surface cooperable with the spout surface 87, may be clamped to each spout 37 with the aid of a yoke 90 coacting with a shoulder on the extension 89, and a cap screw 91 coacting with the yoke 90. With this assemblage of elements, it is possible to apply extensions 89 of any desired length to the delivery ends of the spouts 37, and to thereby adapt these spouts to cans 45 of various heights, and the can hooks 26 may likewise be replaced by others which will fit cans 45 of various diameters.

While the normal use and operation of my present improved filling mechanism should be apparent from the foregoing detailed description, this use and operation will again be briefly described. The machine is adapted to handle various liquids such as vegetation juices and oils, and during the normal operation thereof, the main drive shaft 48 is being constantly rotated by power applied to the pulley 51, thereby rotating the shafts 21, 49, 50, and the can feed screw 44, and causing the disks 24, 43, 46 and the associated parts to revolve about their respective central vertical axes. One or more of the no-can-no-fill mechanisms 41 should first be properly positioned and secured to the supporting ring 42, and the threaded rods 30 of the several measuring cylinders 27 should of course be adjusted to predetermine the length of stroke of the pistons 29 before the machine is placed in operation. As the successive empty cans 45 are delivered to the revolving supporting disk 24 and into engagement with the can hooks 26 by the feed screw 44 and disk 43, they are advanced about the axis of the upright shaft 21 until they ultimately engage the shoe 70 of the first mechanism 41. When the shoe 70 is thus engaged by a can 45, the corresponding delivery spout 37 will have been lowered as shown to the right of Fig. 1, and the corresponding valve 31 will then be shifted to cause the corresponding displacement piston 29 to move and discharge a measured batch from one side of the piston to the receiving can 45. As the can 45 proceeds about the central axis of the machine, it may be caused to engage the shoe 70 of another no-can-no-fill mechanism 41, thereby again moving the corresponding valve 31 and causing the corresponding piston 29 to deliver another measured batch from its opposite side, into the can 45. While one measured batch of liquid may be sufficient, it is possible by providing more mechanisms 41, to deliver two, three, four or more of these batches to each can 45, and the filled cans 45 are subsequently delivered from the machine by the discharge disk 46 and can hooks 47. If no can 45 is in position to receive a charge of liquid, when the corresponding can hook 26 passes a mechanism 41, then the corresponding valve 31 will remain undistributed and no liquid will be delivered from the corresponding spout 37. The successive spouts 37 will remain down until the loaded cans 45 are about to be delivered from the supporting disk 24, when the spouts will be elevated as shown at the left of Fig. 1, preparatory to reception of a subsequent empty can 45.

It is to be noted that when the spouts 37 are in normal delivery position over the corresponding cans 45, liquid will drain through the spouts and into the cans. However, when the cans 45 are removed, the spouts 37 should be elevated. Upon elevation of each spout 37 from the position shown in Fig. 7 to that shown in Fig. 8, the recess 82, which communicates with the interior of the spout 37 will be brought into communication with the corresponding port 83 and drippings will drain from the spout interior into the receptacle or pan 85 through the pipes 84, thus avoiding delivery of these drippings onto the revolving disk 24. However, when a subsequent empty can 45 is brought into position beneath each spout 37, then the spout is lowered so as to diminish the gap between the discharge end of the spout and the adjacent can 45. If it is desired to operate on lower cans 45, an adapter 89 such as shown in Fig. 10 may be quickly and conveniently applied to each spout 37, thus making it possible to operate on cans of various heights. The adjustability afforded by the rods 30, and the provision of more or less mechanisms 41 will obviously permit filling of cans 45 having different capacities.

From the foregoing detailed description it will be apparent that my present invention provides an improved filling mechanism which is extremely simple, compact and durable in construction and which is moreover highly flexible and efficient in operation. All of the parts of the mechanism are conveniently accessible for inspection and cleaning, and the clamping bars 72 will obviously permit convenient removal of the valves 31 from their tapered retaining sockets. The improved filler may obviously be operated to handle various classes of liquid, and is especially useful in filling cans 45 with lubricating oil or the like, by virtue of the provision of the drip eliminating feature. The mechanism is quickly and conveniently adjustable to accommodate various conditions of operation, and the location of the measuring cylinders 37 beneath the valves 31 and beneath the support 24, effectively prevents trapping of air within the measuring pockets, so that accurate pre-measurement is assured at all times. This location of the measuring cylinders 37 beneath the valves 31 and can support 24, is extremely important and overcomes serious objection to prior fillers wherein the measuring pockets were located above the can supports, and in which excessive enlargement of the liquid supply tubes and resultant lack of capillary attraction in these tubes sufficient to prevent ingress of atmospheric air, would permit such air to enter the measuring chambers and destroy the accuracy of measurement. The assemblage is entirely automatic in normal operation, and any number of the no-can-no-fill mechanisms 41 may be provided and these may be readily positioned at any desired place about the supporting ring 42.

It should be understood that it is not desired to limit this invention to the exact details of construction or to the precise mode of use herein shown and described, for various modifications within the scope of the claims may occur to persons skilled in the art.

I claim:

1. In combination, an annular series of measuring cylinders revolvable about an axis and each having therein a piston movable in opposite directions by liquid under pressure admitted to the cylinder, means for supporting receptacles above and closely adjacent to said cylinders, a spout for conducting liquid from each of said cylinders into the top of an adjacent receptacle, means for positively moving the delivery ends of said spouts both toward and away from the successive adjacent receptacles, and a valve interposed directly between each of said cylinders and said supporting means and being operable by the receptacles to alternately connect the two opposite displacement chambers of each cylinder with the corresponding spout.

2. In combination, an annular series of measuring cylinders revolvable about an axis and each having therein a piston movable up and down by liquid under pressure admitted to the cylinder, means for supporting receptacles above and closely adjacent to said cylinders, a swing spout for conducting liquid from each of said cylinders into the top of an adjacent receptacle, stationary means for periodically swinging each of said spouts about a horizontal pivot disposed between said axis and an adjacent receptacle to move the delivery ends of the spouts toward and away from the receptacles, and a valve interposed directly between each of said cylinders and said supporting means and being intermittently revolvable about a horizontal axis by the receptacles to alternately connect the upper and lower displacement chambers of each cylinder with the corresponding swing spout.

3. In combination, an annular series of measuring cylinders revolvable about an axis and each having therein a piston movable up and down by liquid under pressure admitted to the cylinder, means for supporting receptacles above and closely adjacent to said cylinders, a swing spout for conducting liquid from each of said cylinders into the top of an adjacent receptacle, stationary means for periodically swinging each of said spouts about a horizontal pivot disposed between said axis and an adjacent receptacle to move the delivery ends of the spouts toward and away from the receptacles, valve means operable by the swinging motion of said spouts for effecting drainage of liquid from within each spout when the same is moved away from said supporting means, and a valve interposed directly between each of said cylinders and said supporting means and being intermittently revolvable about a horizontal axis by the receptacles to alternately connect the upper and lower displacement chambers of each cylinder with the corresponding swing spout.

4. In combination, an annular series of measuring cylinders revolvable about an axis, means for supporting receptacles adjacent to said cylinders, a swing spout for conducting liquid from each of said cylinders into the top of an adjacent receptacle, stationary means having an annular cam groove concentric with said axis, a pivotal support for each of said spouts disposed between the ends thereof, and a roller carried by the inner end of each spout and coacting with said cam groove to periodically swing the opposite liquid delivery end of the spout toward and away from the successive receptacles.

5. In combination, an annular series of measuring cylinders revolvable about an axis, means for supporting receptacles adjacent to said cylinders, a swing spout for conducting liquid from each of said cylinders into the top of an adjacent receptacle, stationary means having an annular cam groove concentric with said axis, a pivotal support for each of said spouts disposed between the ends thereof, a roller carried by the inner end of each spout and coacting with said cam groove to periodically swing the opposite liquid delivery end of the spout toward and away from the successive receptacles, and valve means operable by the swinging movement of each spout to effect drainage of liquid therefrom when the spout is swung away from said receptacle supporting means.

6. In combination, an annular series of measuring cylinders revolvable about an axis, means for supporting receptacles adjacent to said cylinders, a swing spout for conducting liquid from each of said cylinders into the top of an adjacent receptacle, stationary means having an annular cam groove concentric with said axis, a hollow liquid conducting member pivotally supporting each of said spouts between the ends thereof and providing a passage for delivering liquid to said spout, anti-friction means carried by the inner end of each spout and coacting with said cam groove to swing the opposite delivery end of the spout toward and away from the successive receptacles, and valve means operable by the swinging movement of each spout to simultaneously shut off the flow through the adjacent supporting member and to effect drainage of liquid from the corresponding spout when its delivery end is moved away from said receptacle supporting means.

7. In combination, an element rotatable about a vertical axis, means carried by said element for revolving a series of receptacles about said axis, a series of hollow standards mounted upon said receptacle revolving means between the receptacles and said axis, a spout pivotally suspended from each of said standards and being communicable with the interior thereof to deliver liquid to an adjacent receptacle, means cooperable with the inner end of each spout to swing the outer liquid discharge end thereof toward and away from an adjacent receptacle, and valve means operable by the swinging movement of each spout to shut off the flow of liquid to said spout and to simultaneously effect drainage of liquid therefrom when the discharge end of the spout is moved away from an adjacent receptacle.

8. In combination, means for revolving a series of receptacles about an axis, a series of hollow standards mounted upon said receptacle revolving means, a spout pivotally suspended at its medial portion from each of said standards and being communicable with the interior thereof to deliver liquid to an adjacent receptacle, means cooperable with the inner end of each spout to swing the outer liquid discharge end thereof toward and away from an adjacent receptacle, and valve means operable by the swinging movement of each spout to prevent flow of liquid to said spout and to simultaneously effect drainage of liquid therefrom.

9. In combination, a receptacle support rotatable about a vertical axis, a series of hollow upright standards mounted upon said support, a swing spout pivotally suspended from each of said standards and being communicable with the interior thereof to deliver liquid to an adjacent receptacle, stationary means cooperable with the inner end of each spout to swing the outer liquid discharge end thereof downwardly and upwardly away from an adjacent receptacle, and valve means carried by each of said standards and being operable by the swinging movement of the corresponding spout to shut off the flow of liquid to said spout and to simultaneously effect drainage of liquid therefrom.

10. In combination, an annular receptacle support revolvable about a vertical axis, a series of conduits carried by said support, a spout pivotally suspended at its medial portion from each of said conduits and being communicable therewith to deliver liquid to an adjacent receptacle, cam means cooperable with the end of each of said spouts adjacent to said axis to swing the opposite liquid discharge end thereof toward and away from an adjacent receptacle, and valve means operable by the swinging movement of each spout to disconnect the same from the adjacent conduit and to simultaneously effect drainage of liquid therefrom.

FRANK D. CHAPMAN.